Figure 1:
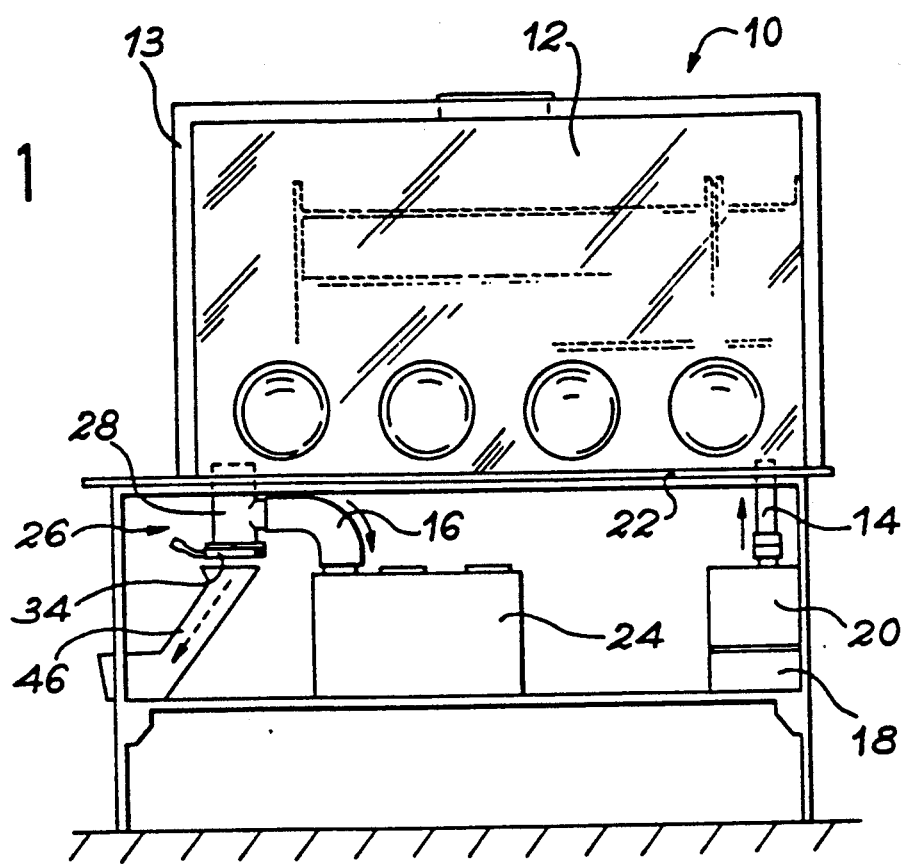

United States Patent [19]

Saint Martin

[11] Patent Number: 5,022,794
[45] Date of Patent: Jun. 11, 1991

[54] FAST DISCHARGE AND INTRODUCTION DEVICES FOR A TIGHT INSULATOR

[75] Inventor: Bernard Saint Martin, Montrouge, France

[73] Assignee: Iso Concept S.A., Boulogne, France

[21] Appl. No.: 447,425

[22] Filed: Dec. 7, 1989

[30] Foreign Application Priority Data

Dec. 15, 1988 [FR] France ............................ 8816566

[51] Int. Cl.⁵ .............................................. B65G 51/12
[52] U.S. Cl. ..................................... 406/171; 406/180
[58] Field of Search ............... 406/108, 139, 154, 171, 406/172, 176, 180

[56] References Cited

U.S. PATENT DOCUMENTS

| | | | |
|---|---|---|---|
| 1,108,094 | 8/1914 | Ferguson | 406/171 |
| 1,666,758 | 4/1928 | Stoetzel | 406/180 |
| 1,921,391 | 8/1933 | Jennings | 406/176 |
| 1,923,052 | 8/1933 | Chulstrom | 406/176 |

FOREIGN PATENT DOCUMENTS

| | | | |
|---|---|---|---|
| 2608460 | 12/1986 | European Pat. Off. | |
| 2241372 | 3/1974 | Fed. Rep. of Germany | 406/180 |
| 2140277 | 1/1973 | France | |
| 2354133 | 1/1978 | France | |

Primary Examiner—Sherman Basinger
Assistant Examiner—Stephen P. Aviva
Attorney, Agent, or Firm—Kerkam, Stowell, Kondracki & Clarke

[57] ABSTRACT

A tight insulator (10) is equipped with a ventilation circuit having an intake pipe (14) and an exhaust pipe (16), in such a way that the internal insulator volume (12) is under an overpressure with respect to the outside. In order to rapidly discharge objects from volume (12), a discharge tube (28) is provided, which is closed by a door (34) and to which is connected the exhaust pipe (16).

10 Claims, 1 Drawing Sheet

U.S. Patent    June 11, 1991    5,022,794

FAST DISCHARGE AND INTRODUCTION DEVICES FOR A TIGHT INSULATOR

DESCRIPTION

The invention relates to a device making it possible to rapidly discharge objects of random natures and shapes from a tight insulator under an overpressure and a device making it possible to introduce these objects rapidly into an insulator under a vacuum or underpressure.

The invention more specifically applies to tight insulators containing air or gas at a pressure higher than that prevailing outside the insulator. This situation corresponds to all uses in which it is necessary to avoid the external atmosphere penetrating the interior of the insulator. Thus, it more particularly relates to tight insulators used for medical, electronic, pharmaceutical and biomedical applications.

One of the essential difficulties felt by designers and users of such insulators under overpressure relates to the possibilities of extracting different objects without any modification to the atmosphere prevailing within the insulator. The term "objects" is to be understood in the widest sense, i.e. independently of the nature of such objects, their consistency and their shape.

The invention also applies to tight insulators operating under vacuum and which contain a hostile, dangerous or contaminating medium. In this case, one difficulty relates to the introduction of random objects into the insulator without any risk for personnel located on the outside.

A solution conventionally made to this problem consists of equipping the insulators under overpressure with one or more transfer locks issuing to the outside and equipped with means permitting their sterilization.

It is also known to use tight transfer containers, which can be linked with the insulator via double door systems preserving the confinement of the latter.

Although these existing solutions are perfectly satisfactory from the standpoint of preserving the confinement of the insulator, they involve relatively long procedures, which are sometimes particularly disadvantageous for users.

Another known solution, more particularly used in medicine, consists of breaking the seal of the insulator by creating in its wall one or more openings issuing directly to the outside. To prevent the penetration of external air into the insulator, each opening is then equipped with a so-called laminar flow device through the said opening, whereby air scavenging serves to create an air curtain at this location. However, in practice this solution is not very effective and part of the external air almost always traverses the air curtain and penetrates the insulator.

The present invention specifically relates to an original device making it possible by simple, fast operations to discharge objects from a tight insulator under an overpressure without the external air penetrating the latter.

According to the invention this result is achieved by means of a device for the rapid discharge of objects for a tight insulator in which there is a pressure above the external pressure, said insulator being equipped with a ventilation circuit having an intake pipe and an exhaust pipe equipped with filtering means, said device being characterized in that it comprises a discharge tube, whereof one end issues into the insulator and whereof the opposite end is tightly sealed by a door, the exhaust pipe issuing into the discharge tube in the vicinity of the door.

In this device, in view of the fact that the exhaust pipe creates a suction action in the discharge tube, in the vicinity of the door sealing the latter, the discharge tube is scavenged over its entire length by an air or gas flow directed towards the outside of the insulator. When objects have to be discharged from the latter, they are firstly placed in the discharge tube and then the door sealing the latter is opened. The air or gas circulation then continues in the same direction and at a higher rate, because there is less opposition, the air no longer having to overcome the barrier constituted by the filter located in the exhaust pipe. Moreover, if a small quantity of external air should penetrate the end of the discharge tube, said air would be completely taken up by the air or gas flow sucked up by the exhaust pipe. When all the objects have been discharged and the door has been reclosed, the atmosphere contained in the insulator is consequently unmodified.

According to a preferred embodiment of the invention, the exhaust pipe is connected approximately at right angles to the discharge tube and the latter is in the form of a cylinder.

Preferably, to facilitate the discharge of objects, the discharge tube is oriented approximately vertically and connected to the bottom of the insulator.

In parallel, the invention also relates to a device making it possible to introduce objects into a tight insulator under vacuum.

For this purpose, the invention proposes a device for the fast introduction of objects for a tight insulator in which there is a pressure below the external pressure, said insulator being equipped with a ventilation circuit having an intake pipe and an exhaust pipe equipped with filtering means, said device being characterized in that it comprises an introduction tube, whereof one end issues into the insulator and whereof the opposite end is tightly sealed by a door, the intake pipe issuing into the introduction tube in the vicinity of the door.

The invention is described in greater detail hereinafter relative to a preferred, but non-limitative embodiment and the attached drawings, wherein show:

FIG. 1 A side view of a tight insulator equipped with a device for the fast discharge of objects according to the invention.

Figure 2:
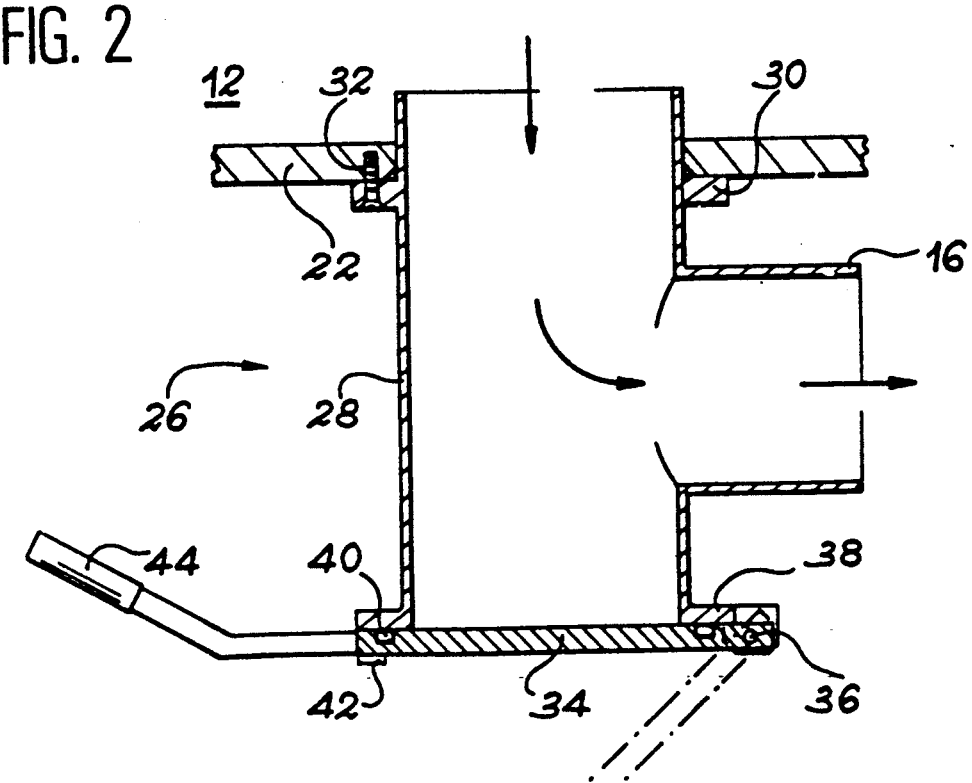

FIG. 2 A sectional view on a larger scale of said device.

In FIG. 1, reference 10 designates in general terms a tight insulator defining a closed volume 12 in which the pressure is permanently maintained at a value above the atmospheric pressure prevailing outside the insulator.

The volume 12 defined by the tight insulator wall 13 is filled with sterile air, which is permanently replenished by an open ventilation circuit having an air intake pipe 14 and an air exhaust pipe 16. The air intake pipe 14 is equipped with ventilating means 18, such as a pump or a fan taking air outside the insulator and then forcing it into the volume 12 through a filter 20. In the embodiment shown, said pipe 14 issues into the bottom 22 of the insulator.

The air exhaust pipe 16, which is also connected to the bottom 22 of the insulator, discharges the air contained in volume 12 into the external atmosphere through a filter 24.

According to the invention and as shown in detail in FIG. 2, the insulator 10 is equipped with a device for the rapid discharge of objects designated in general terms by reference numeral 26. Device 26 essentially comprises a cylindrical discharge tube 28, whose axis is approximately vertically oriented. The upper end of the discharge tube 28 is connected to the insulator bottom 22, e.g. by means of a flange 30 welded to tube 28 and fixed to the bottom 22, e.g. by means of screws 32. A not shown seal ensures the sealing of said fixture. The discharge tube 28 thus issues by its upper end directly within the volume 12 defined by the insulator.

At its lower end, the discharge tube 28 is tightly sealed by a door 34. In the embodiment diagrammatically shown in the drawings, the door 34 is articulated by a spindle 36 on a flange 38 welded to the lower end of tube 28. An annular seal 40 located in a groove formed in door 34 ensures the sealing by coming into contact with flange 38 when the door is closed.

Door 34 is maintained in the closed position by any appropriate means, such as a bolt 42. The opening and closing of door 34 are e.g. ensured by means of a handle 44 integral with door 34.

According to an essential feature of the invention, the air exhaust pipe 16 issues into the discharge tube 28 in the vicinity of door 34. In the represented embodiment, the air exhaust pipe 16 is connected approximately at right angles to tube 28.

Under the normal conditions of use of insulator 12, door 34 is kept closed. The confinement of volume 12 defined by the door of the insulator is consequently preserved. Under these conditions, the ventilation circuit operates permanently. Consequently the air contained in the discharge tube 28 is permanently scavenged by a descending air flow in said tube and forced towards the air exhaust pipe 16, bearing in mind the overpressure in volume 12 compared with the external atmosphere.

When different objects must be discharged from volume 12, said objects are placed within the discharge tube 28, where they are stacked on door 34. The latter is then opened by unlocking bolt 42, in such a way that the objects descend by gravity in a chute 46, which is preferably provided below door 34 and as is diagrammatically shown in FIG. 1. It should be noted that the control of the opening of the door can take place by any appropriate means, both from the outside and inside of the insulator.

When door 34 is open, the downwardly flowing air within the discharge tube 28 is sped up under the effect of the pressure difference prevailing between volume 12 and the outside. Only a very small air quantity on the outside consequently rises within the discharge tube 28. Moreover, this small air quantity is automatically taken up by the air flow sucked up by the air exhaust pipe 16. Consequently, when door 34 is closed again, no measurable external air has penetrated volume 12.

In the embodiment shown, the advantages of the fast discharge device according to the invention are increased by the positioning of the discharge tube 28 beneath the bottom 22 of the insulator, which enables the objects to be very rapidly discharged. As a variant, the fast discharge device according to the invention could also be located on other walls of the insulator without passing beyond the scope of the invention.

In practice, the diameter of the discharge tube 28 is chosen as a function of the size of the objects to be discharged from the insulator. The length of the tube is then determined as a function of the air flow which it is wished to obtain within said tube. For example, a permanent minimum air speed of approximately 2 m/s can be obtained in the discharge tube 28, which guarantees that the atmosphere contained in volume 12 is preserved. The connection of the air exhaust pipe 16 is as close as possible to the end of the discharge tube 28 carrying door 34.

Obviously, the invention is not limited to the embodiment described in exemplified manner hereinbefore and covers all variants. Thus, although the discharge tube 28 is preferably cylindrical, it can in special cases have a non-circular cross-section and can e.g. be square or rectangular. Door 34 can also be differently constructed and can e.g. be in the form of a trapdoor, which slides or pivots about an axis parallel to that of the discharge tube.

Moreover, in place of the open circuit described, the insulator ventilation circuit can be a closed circuit. In this case, the volume 12 defined by the insulator walls can contain a gas other than air. It is then necessary to provide a compensation system, whose flow will compensate the gas escape due to the opening of the trapdoor.

Finally, although the device according to the invention is particularly suitable for the discharge of objects from an insulator under an overpressure, it can also be used for introducing objects into an insulator under vacuum. In this case, the installation of the discharge tube is completely identical to that described with reference to FIGS. 1 and 2, but the air flow direction in the ventilation circuit is reversed. This means that pipe 16 becomes the air or gas intake pipe and pipe 14 becomes the exhaust pipe. The ventilation means 18 are then placed in pipe 16, whilst each of the pipes 14 and 16 remains equipped with a filter 20, 24. Obviously, the discharge tube 28 then becomes an introduction tube.

I claim:

1. Device for the rapid discharge of objects for a tight insulator in which there is a pressure above the external pressure, said insulator being equipped with a ventilation circuit having an intake pipe and an exhaust pipe equipped with filtering means, said device being characterized in that it comprises a discharge tube, whereof one end issues into the insulator and whereof the opposite end is tightly sealed by a door, the exhaust pipe issuing into the discharge tube in the vicinity of the door and said door is provided with means normally maintaining said door in a closed and locked position.

2. Device according to claim 1, wherein the exhaust pipe is connected approximately at right angles to the discharge tube.

3. Device according to claim 1, wherein the discharge tube is shaped like a cylinder.

4. Device according to claim 1, wherein the insulator has a horizontal bottom, the discharge tube being oriented approximately vertically and connected to said bottom.

5. Device according to claim 4 in which a chute is placed beneath the door.

6. Device for the fast introduction of objects for a tight insulator in which there is a pressure below the external pressure, said insulator being equipped with a ventilation circuit having an intake pipe and an exhaust pipe equipped with filtering means, said device being characterized in that it comprises an introduction tube, whereof one end issues into the insulator and whereof the opposite end is tightly sealed by a door, the intake pipe issuing into the introduction tube in the vicinity of the door and said door is provided with means normally maintaining said door in a closed and locked position.

7. Device according to claim 6, wherein the intake pipe is connected approximately at right angles to the introduction tube.

8. Device according to claim 6, wherein the introduction tube is shaped like a cylinder.

9. Device according to claim 6, wherein the insulator has a horizontal bottom, the introduction tube being oriented approximately vertically and connected to said bottom.

10. Device according to claim 9, wherein a chute is placed beneath the door.

* * * * *